INVENTOR.
Adolphe Peterson.

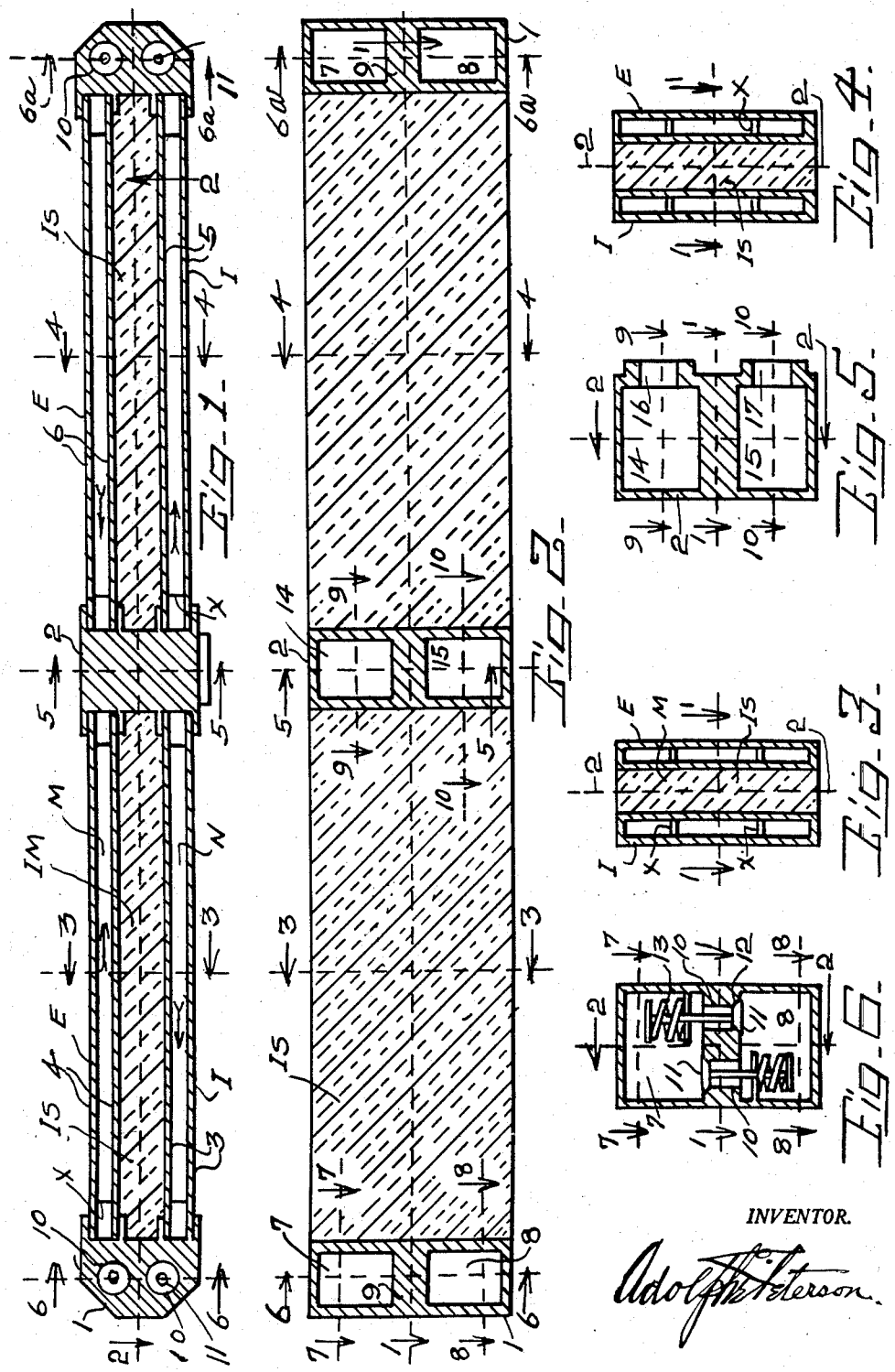

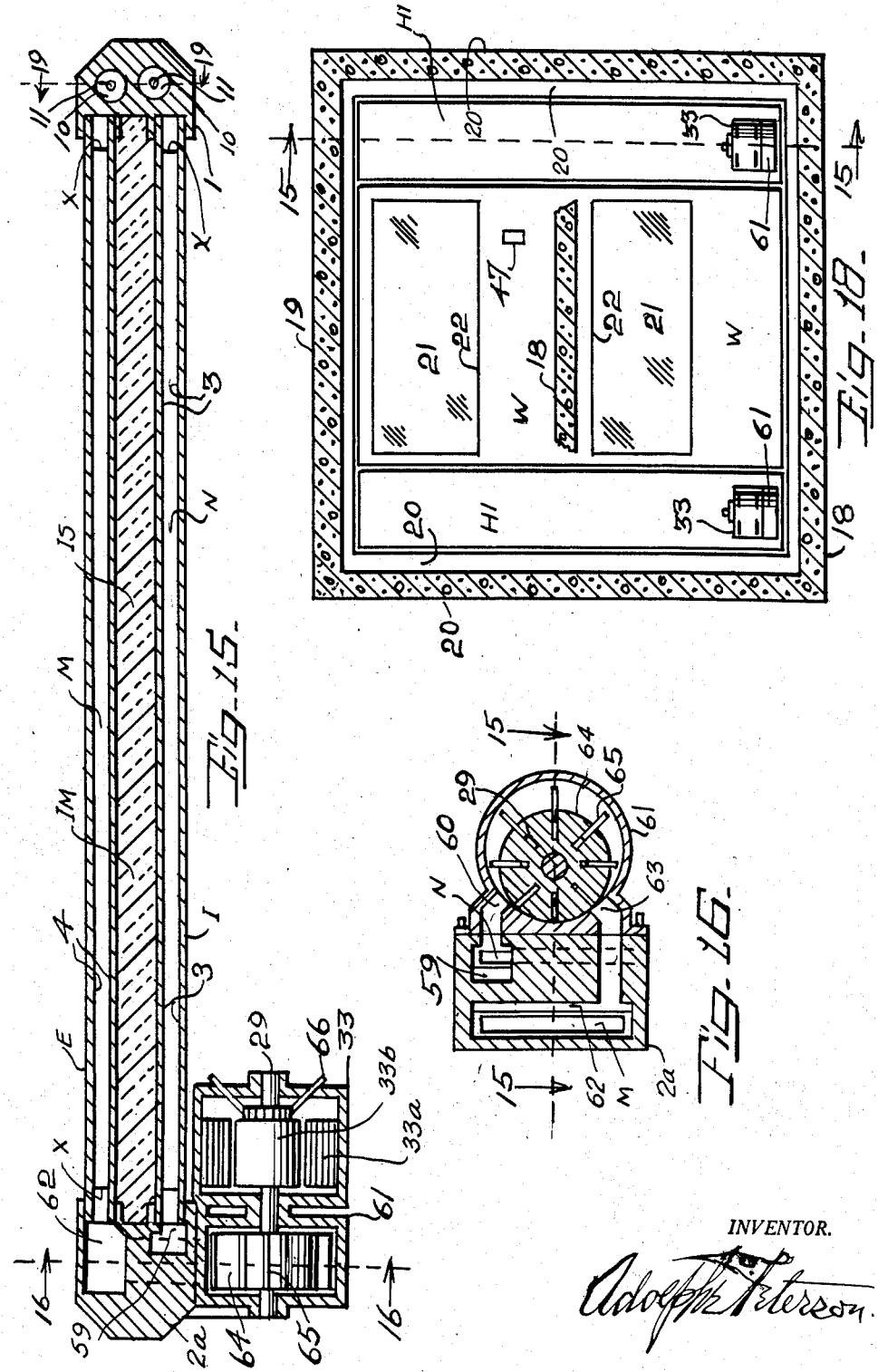

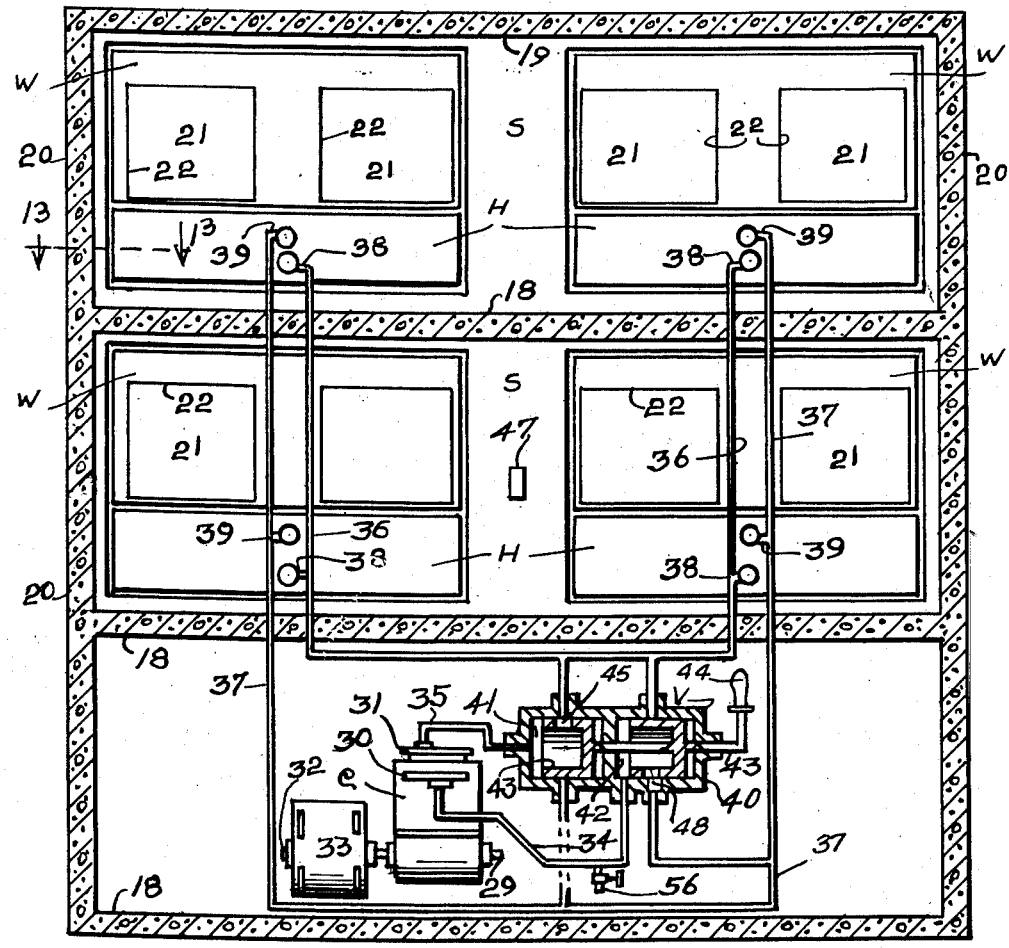
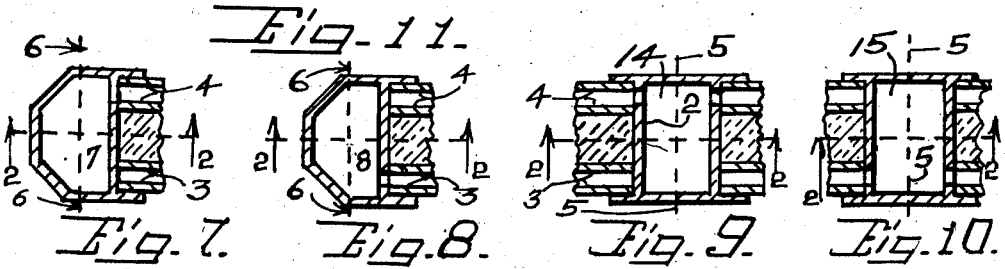
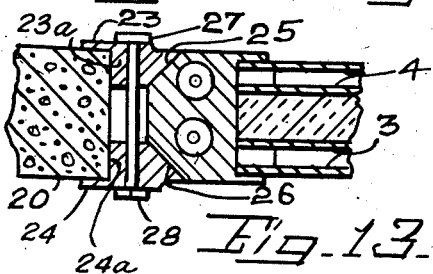

United States Patent Office 2,787,140
Patented Apr. 2, 1957

2,787,140

HEAT PUMP SYSTEM AND CONSTRUCTION

Adolphe C. Peterson, Minneapolis, Minn.

Application April 5, 1954, Serial No. 421,035

10 Claims. (Cl. 62—129)

My invention relates to the type of heating and cooling means which is generally known as heat pump means, and my present invention relates especially to a form of such means which is especially provided for building constructions incorporating such heat pump apparatus, and this invention is therefore called heat pump system and construction.

Heat pump means as now known and used are of a type which is rather high in first cost as compared with the simple heating means, as now known and used, and therefore it is difficult to incorporate such heat pump means of the usually known variety in constructions for use therewith, on account of the considerable additional cost in such incorporation. This invention has as its chief object, the provision of a means of construction of heat pump means and incorporation in constructions, such that the net cost of constructions, incorporating such heat pump means as here disclosed, will not be so large that such heat pump means may not be commonly desired for use in constructions, and so that such heat pump means, as here disclosed, will provide the advantages of heat pump means, for heating and cooling, at a cost which can be generally provided for in constructions, at reasonable first cost for the constructions.

An object is to provide such heat pump means, in a form, such that the construction including such heat pump means is relatively simple, and does not add greatly to the complexity of constructions, in the aggregate. An object is also, to reduce the usual cost of construction maintenance and repair, because of the dual purpose and use of elements of this heat pump means, where and when included in constructions. A further object is to increase the efficiency in use of such heat pump apparatus, both for heating and cooling, this increased efficiency being attained in this invention, because of the possibility of using a greater proportion of heat transfer surfaces in relation to the heat pump output, the possibility of fulfillment of the functions of the heat pump at lower average temperatures, when heating, and higher average temperatures, when cooling, so that lower pressures are necessary in the pressure passages and chambers.

An object is to lessen the requirement of use of labor and materials in a construction employing my invention, so that thus the aggregate expenditure of labor and materials for the construction utilizing the heat pump system is required. A general object is to so increase the efficiency of heat pump apparatus, and to so lessen the aggregate expenditures in constructions, that the heat pump system, as here disclosed, may be widely used and commonly adopted in constructions, with advantage to the owners and users of such constructions.

The principal devices and combinations of devices comprising my invention, are as hereinafter described and as claimed in the appended claims. In the accompanying drawings which illustrate my invention in several modified forms, like characters refer to like parts throughout the views, in so far as practicable. Referring to the drawings:

Figures 1 to 10, both inclusive, show one form of the so-called heat transfer unit which is one essential part of my heat pump system and used in connection with the other essential parts, otherwise shown, and of these figures; 1 is a view in horizontal cross section intermediately of the vertical width of the unit the section being on line 1—1 of Figures 2, 3, 4, 5, 6; 2 is a vertical section intermediately of the horizontal thickness of the unit and is a section on lines 2—2 of Figures 7, 8, 9, 10, 3, 4, 5, 6, 1; 3 is a vertical section on line 3—3 of Figures 1, 2; 4 is a vertical section on line 4—4 of Figures 1 and 2; 5 is a vertical section on lines 5—5 of Figures 1 and 2; 6 is a vertical section on lines 6—6 of Figures 1 and 2; 7 is a horizontal detail section on line 7—7 of Figure 2; 8 is a horizontal detail section on line 8—8 of Figure 2; 9 is a horizontal detail section on line 9—9 of Figure 2; 10 is a horizontal detail section on line 10—10 of Figure 2. Sections on lines 6a—6a of Figures 1 and 2 would be similar to sections as shown in Figure 6 and are therefore not again shown.

Figure 11 is a cross section vertically through a building construction at a section interiorly of the building, through walls and floors and roof, near the or an exterior wall having windows. Figure 11, by the building construction shown, incorporates several of the units which are shown in Figures 1 to 10, both inclusive, and shows in addition, the power and compression pumping means and valve means used with the units, the said valve means being shown in section through its axis, as a detail.

Figure 13 is a detail horizontal cross section on the line 13—13 of Figure 11, through a section of the building frame structure and one end of one unit (such as in Figures 1 to 10) to illustrate one method of securing the units in the building structure.

Figure 12:
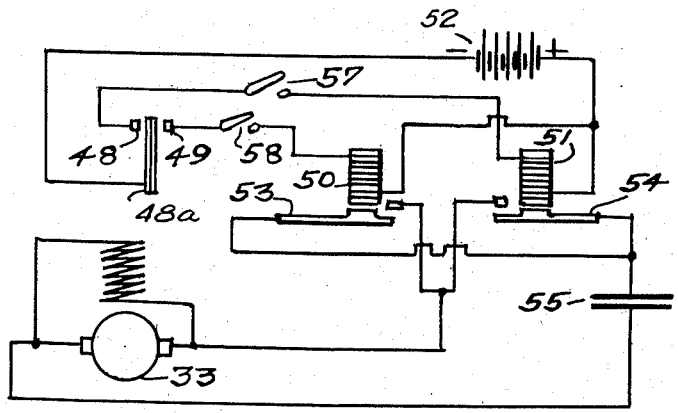
Figure 12 shows a diagrammatic illustration of a circuit including the thermostat control means and other control means in connection with the motor means for the compressor pump means.
Figure 17:
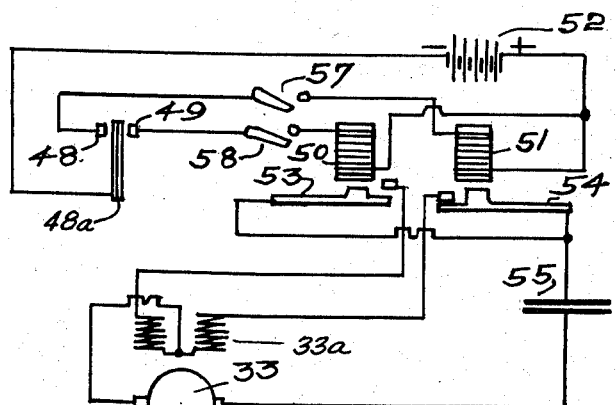
Figure 19:
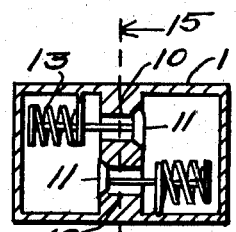
Figure 14:
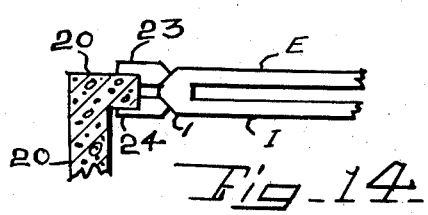
Figure 14 is also a section on line 13—13 of Figure 11 but on a much reduced scale and showing part of the adjoining building wall at right angles and showing the unit H adjoining in a diagrammatic way only.

Figures 15, 16, 17, 18 are views of a modified form of my device; Figure 15 a vertical section through a unit on line 15—15 of Figures 18 and 19, but not showing any of the adjoining walls or floors of the building structure; Fig. 16 is a section on line 16—16 of Figure 15 looking rightwardly in Figure 15, that is looking upwardly from below the unit (as in Fig. 18); Figure 17 is a diagram of the circuit used in this form for operation and control; Fig. 18 is a section through one end of a building having the units H1, therein. Figure 19 is a section on the line 19—19 of Figure 15.

The invention or device comprises as a part of its apparatus and system one or more units, such as shown in Figures 1 to 10, inclusive (or as shown in the modified form), and these units constitute a part of a heat cycle system, incorporating in it also a circulating and compressing means and control means therefore, which last named means, other than the units (such as in Figures 1 to 10) are shown in the illustration of the complete system in Figure 11. The units, which are generally called heat transfer units, are each composed of so-called conduit panels placed in parallel position and supported thusly, and spaced apart so that there is insulation space between the conduit panels which may or may not have any insulation material placed therein. The conduit panels may have supporting elements at each end and intermediately also of the length (or only at each end as in the modified form). A heat transfer unit having parallel conduit panels, with supporting elements at each end and also intermediately, is shown in Figures 1 to 10, and this is now particularly described.

At each end of the heat transfer unit there is a supporting element designated 1 and intermediately of the length of the heat transfer unit there is another supporting element designated 2. The supporting elements 1 have three functions; one, to provide metallic connecting means to support the conduit panels in position, parallel to each other; two, to contain within them compression maintaining means or expansion means to permit passage of fluid; three, to provide means by which the heat transfer unit may be supported in a construction incorporating the system.

Each supporting element 1 and 2 is of a vertical height approximately that of the panels supported between them and of a thickness about equal to the total thickness of the space occupied transversely of the panels of the unit. Between the supporting element at one end, and the supporting element 2 there are mounted the two parallel conduit panels 3 and 4 and between the supporting element 1 at the other end and the supporting element 2, there are mounted the two parallel conduit panels 5 and 6. All of these conduit panels are open at one end to a space within the adjacent supporting element 1 and are open at the other ends to space within the intermediate supporting panel 2 so as to provide for the circulation, as hereinafter described. The conduit panels otherwise form closed conduits and are made of a material such as steel or aluminum or an alloy of metal, preferably, although it should be noted that these panels may be made of any plastic which is sufficiently strong and impervious in character so that the pressures to be encountered in use, will be maintained without any failure of the material.

Each supporting element 1 of the unit has within it an upper space 7 and a lower space 8 and one is connected with the conduit space within one adjoining conduit panel and the other is connected with the conduit space within the other adjoining panel. The spaces 7 and 8 in each supporting element 1 are divided by the horizontal partition wall 9 and in this wall 9 in each element 1 there are two ports or passages 10, each having associated with it a valve 11 seating on a valve seat 12, each valve being yieldably held on its seat by a coil spring 13. Figure 6 shows the arrangement of the valve means in each of the elements 1, and by reference to this Figure 6, it will be seen that the valve seats and the valves of an element 1 are so arranged, oppositely, that one will open automatically by pressure at one side to permit flow from the upper space 7 to the lower space 8 and the other will open automatically by pressure from the other side or space to permit flow from the lower space 8 to the upper space 7, but so when one valve so opens by pressure in one space 7 or 8, the other valve will be held closed by the same pressure, so that this flow of fluid is permitted in only one direction as between the spaces 7 and 8 and flow is barred in the other direction, and that this flow is according to the existing pressure at any one time in the conduit panels adjacent to the element 1. The coil springs 13 are of such a compression and strength that the valves will be held closed at any time until the pressure in an adjoining conduit panel exceeds a predetermined pressure, which will be the pressure at which the compressor means hereinafter described operates and will be the pressure at which the conduit panels which at the moment or season, are heat dispersal, that is heat supplying or disposing, contain the fluid within them. No means of adjustment of this pressure of the coil springs 13 is shown, but it is contemplated that any means of such adjustment, as is commonly used for such adjustments, may be provided and used.

The intermediate supporting element 2 of the unit, has an upper space 14 and a lower space 15, and one of these spaces is connected with the conduits within the adjoining two conduit panels which are designated by the letter E as exterior conduit panels, and the other is connected with the conduits within the adjoining two conduit panels which are designated by the letter I as interior conduit panels.

The space 14 in element 2 may be connected, as hereinafter described, by a port 16, and the space 15 may be connected, as hereafter described, by a port 17, with the fluid circulating pipes or passages of the circulating and compressing means, which will be united with the unit in its assembling in any construction. By these spaces 14 and 15, therefore, the unit may be connected into a heat pump fluid circuit, so that by one of these spaces the fluid is conducted into two adjoining conduit panels so that the fluid will flow into them, and so that by the other one of the two spaces 14, 15, the heat pump fluid is conducted or exhausted out ow two adjoining conduit panels. The conduit panels connected with one space 14, 15, are always either exterior or interior conduit panels, and these connected with the other space 14, 15, are always the opposite, but the same, that is either exterior or interior conduit panels.

The unit has between the pair of exterior conduit panels denoted E and the pair of interior conduit panels, denoted I, an insulation space, designated IS, and this space may or may not have insulation material within it designated IM. This insulation provision, whether just air space or space with air confining material such as rock wool or asbestos material, or glass fibre, or otherwise, should be sufficient to adequately provide against passage of heat from interior to exterior panels or vice versa, but some passage of a slight proportion of heat, will not be prohibitive, and some such passage will result in its recovery as hereinafter described.

The unit has its supporting elements 1, at the ends, formed in a wedge shaped form in transverse cross section at one extreme end, and this wedge shaped end will be used in connection with the other elements as shown in Figure 13, and hereinafter described, to support the heat transfer unit, in a construction, by attachment to a construction frame. Each of the conduit panels in the unit has within it, placed in a manner as not to interfere with the flow of fluid in the circulation, strengthening ribs X, which are welded at their opposite edges to the interior surfaces of the two side walls 3—3, 4—4, or 5—5, or 6—6 which form the conduit panel.

The unit, which has been described as a heat transfer unit, is a unit, which is used as such in constructions and with any form of circulating and compressing means motor driven or power driven, the circulating and compressing means with its power driving means, forming in the aggregate the complete heat pump means One form of this circulating and compressing means is shown in Figure 11 in connection with the illustration of the assembling of units such as first described, in a construction. In the construction shown, Figure 11, four of the heat transfer units such as described in connection with Figures 1 to 10, are assembled with one wall at one side or end of a building construction. The construction has a framing structure, floors 18, roof 19, side walls 20, and shows in vertical cross section one first floor or main room, one upper room and a basement. The framing structure formed by the side walls 20 are of only narrow width, comparatively, and the greater part of the side wall enclosure of the construction, is formed by panels. The four heat transfer panels denoted H, generally, occupy portions of the spaces between the framing structure 20, say approximately one third of that wall space, or slightly more or less than that proportion. The remaining portion of that enclosing space between the portions of the framing structure 20, is occupied or filled in with panels W which are chiefly window panels having windows 21 fixed in the panel frame portions 22, the windows 21 being of glass or translucent plastic material, the panel frame portions 22 being formed in any manner of some metal such as steel or aluminum or of any suitable plastic or wood. The wall structure enclosing the building structure is thus formed chiefly of the two types of panels, the window panels and the heat transfer panels or units H, the latter forming approximately one-third or slightly more or less a portion of the total wall enclosure of the construction. Thus the heat transfer units H serve as the enclosure means for approximately one-third, or thereabouts, of the enclosing structure.

The panel units H, and W, are each of them, of each type, supported in place on the frame structure by any suitable means which may be such means for supporting panels, as are commonly used for supporting panels in walls of structures, or it may be the supporting means as shown in Figure 13, this supporting means being illustrated merely as one form of such means, that is as a means for such support of the panels in the structure, so that the panels or units form a part of the enclosing structure. Each unit H (and likewise each unit W) will then have the supporting means as shown in Figure 13, to support the panel or unit in the wall structure, and each will have this supporting means, as in Figure 13, at each end of the unit H or unit W.

The side walls, denoted as 20, are more in the nature of a vertical framing structure, and it may be of concrete as shown, or of any material such as steel, or wood, or aluminum, and any part of the supporting means may be formed integrally with the framing structure 20. As shown, in Figure 13, the supporting means consists mainly of two molding strips shown in cross section, one 23 on the exterior side and the other 24 on the interior side, and each has a flange 23a or 24a which impinges against the edge or corner of the framing structure 20, and each has an angled or wedge edge 25 or 26 which impinges against the wedge edge of the adjacent end of the unit H. The two holding strips 23 and 24, are held firmly in the positions shown against the side edges of the adjacent end of the unit H by means of bolts 27 which are passed through both of the molding strips and have nuts 28 placed on them to firmly secure the bolts and the molding strips in position, and thus also to secure the unit H in position. Any such means for securing units H and units W in position may be used, but that shown or any type which will hold the units H in position and prevent any air leakage around the ends of the unit H, are preferably used. This means is at each end of the unit H, and such means are used with each unit H, so that all units H are thus firmly held in place so that the units H form a part of the structure enclosure, and fulfill their function as part of the wall structure, being thus in place of other enclosure in the space occupied, and serving also as transfer units in conjunction with the circulating apparatus.

The means for circulating and compression of the heat pump fluid, which may otherwise be called the refrigerant fluid, or the carrier fluid, is now described. A compressor generally designated C has a crank shaft 29 and intake manifold 30 and discharge manifold 31 and has the usual compressor pistons and connecting rods and valve means these detail elements not being shown, since they are common to compressors, and no invention is claimed in the form of the compressor. The compressor shaft 29 is an extension of or rotatably connected with the electric motor shaft 32 of the electric motor 33, the latter being any form of motor such as is adapted to be driven by the usual electric current supply from utility companies.

The compressor C is connected by the conduits 34 and 35, 34 to intake manifold 30 and 35 to discharge manifold 31 through an intervening valve means generally denoted V with house or main conduits 36 and 37, but the connection with the latter two conduits is variable, being subject to the control valve means V. The one conduit 36 has individual branches 38 which are secured by any means such as welding or bolting (not shown) to the intermediate supporting elements 2 so as to connect each branch 38 through a port 17 of one element 2 and thereby with a lower space in that element. The conduit 37 has individual branches 39 which are secured by any means such as welding or bolting (not shown) to the intermediate supporting elements 2 so as to connect each branch 39 through a port 16 of one element 2 and thereby with an upper space in that element 2. Thus conduits 36 and 37 being main conduits connect, one through the lower spaces 15 with the heat transfer units, and one through the upper spaces 14 with the heat transfer units H, and provision is thus made for circulation of fluid through the heat transfer units H in the same relative manner as to all of them, but at any time, as controlled by the valve means V.

The valve means V, interposed between the pair of conduits 34—35 connecting with compressor C, and the pair of main conduits 36—37, provides for alternative connection with the compressor C, so that in one phase of operation, for one seasonal condition, the exterior conduit panels E may be connected with the intake manifold 30 of the compressor C and the interior conduit panels I may be connected with the discharge manifold 31 of compressor C; and so that for the alternative phase of operation, for the opposite seasonal condition, the exterior conduit panels E may be connected with the discharge manifold 31 and the interior conduit panels I may be connected with the intake manifold 30 of compressor C. By this alternative means, the interior conduit panels I become heat dispersing panels in cold or winter season (the exterior then being heat absorptive conduit panels), and in the hot or summer season, the interior conduit panels I become heat absorption conduit panels (the exterior conduit panels E then being heat dispersal conduit panels).

The valve means V has valve casing 40, pressure chamber 41 connected through conduit 35 with the discharge manifold 31 of compressor C, low pressure chamber 42 connected with intake manifold 30 of compressor C by conduit 34, and has the valve 43 rotatable or oscillative in valve casing 40. A hand lever 44 provides means for manually turning the valve 43 to place it in either of the two conduit controlling positions, the one position for cold weather operation, the other for hot weather operation. The valve 43 has one port 45 which may be placed in either of the alternative positions to control passage of fluid from pressure chamber 41. The valve 43 has another port 46 which may be placed in either of the alternative positions to control passage of fluid into low pressure chamber 42 from either conduit 36 or 37. The relation of the ports is such, there being just the one control for valve 43, that either of the main conduits 36 and 37 may be connected with one of chambers 41—42, but not both, and that when one conduit 36 or 37 is connected with one chamber 41 or 42, the other conduit will be connected with the other chamber 41 or 42.

The house interior (Figure 11) will have therein a thermostat 47 which thermostat may be of any kind, but will have provision for control for heating use of the device and also for control of the cooling use of the device. For this purpose the thermostat 47 has the usual two element thermal detecting means 48a (two-metal element) which also serves as in the diagram, as current conductor contacting either one of two contacts 48 or 49, according to temperature, and one of these contacts is in circuit through relay 50 and the other through relay 51, both circuits passing through battery 52 to element 48. The relays control the contact making armature members 53 and 54, and by the latter a circuit may be completed through electric motor 33 and current mains 55 which provide driving current for motor 33, under either condition of operation, when temperature in the house interior is less than a predetermined minimum, or for the alternative condition when house interior temperature is more than a predetermined maximum temperature.

In the use of my apparatus, after assemblage of the means in the manner indicated, a fluid of the type, or any type which is commonly used with best efficiency, is introduced into all conduits and chambers in the system, so that this fluid occupies all such space including the space within the conduits in exterior conduit panels E and also interior conduit panels I. This fluid may be such a refrigerant fluids as F12 or any of the Freon gases or fluids which are usually used in refrigeration systems, and this fluid may be introduced through supply pipe 56 or any means which may be provided for that purpose.

In either condition of operation the electric motor 33 drives the compressor C to induct the fluid from the conduit system and to discharge the fluid to that same system through the conduits, as controlled by valve V. In the cold season or winter season, the operator or user, sets the valve V in the proper condition, so that when the device operates, the refrigerant fluid is inducted to the compressor C from the exterior conduit panels E and the fluid is discharged under pressure to the interior conduit panels I. The pressure at which the device is designed to operate should be that pressure which provides the best efficiency under all conditions and for the particular device, and may be that pressure under which refrigeration systems customarily operate. It may be noted, however, that because of the nature of this device, and its especial use of heat transfer units, the heating temperature needed in the interior conduit panels I in cold season use, may by lower than would with other systems be needed. In use of the means for either the heating or the cooling use, the valve means described as included within the elements 1, at each end of each panel, will function automatically for either direction of flow of the fluid. For heating use, this expansion valve means permits flow from the interior conduit panels I (of a particular panel or unit) to the exterior conduit panels E, and in this flow the fluid pressure is maintained automatically by the spring control of the valves in elements 1, at the required pressure for operation and use, and the fluid expands through the valves means in elements 1, into the exterior conduit panels E, and in the panels E the expanded fluid, thus cooled, absorbs heat from exterior air passing or flowing naturally outside of the panels E, and will also absorb whatever heat has passed through the insulation from the interior panels I to panels E, thus assisting in conserving that heat. The expanded fluid, after absorbing heat in exterior conduit panels E passes by way of the valve means V to the intake manifold 30 of the compressor C and is compressed in compressor C and discharged as heated fluid to the interior conduit panels I, and this circulation continues, with compression and expansion, until the thermostat 47 by its control discontinues the operation.

For cooling use, in the summer or hot season, the thermostat acting through the relay means closes the circuit of electric current through the motor 33 to drive it, and for this operation, the valve means V is set by hand lever 44 for the opposite condition. In this opposite condition, the expansion valve means in elements 1 permits flow from exterior conduit panels E through the valve means in elements 1 to the interior conduit panels I, and by the valve expansion means, the fluid is expanded and at low pressure in panels I is cool or colder and absorbs heat from the interior space in house interior S by passage of heat from interior air flowing over the interior face panels I (exposed to interior space S) and as thus heated the fluid is inducted to the intake manifold 30 of compressor C and is there compressed and discharged as hotter fluid by manifold 31, and through valve means V, to exterior conduit panels E, where the fluid releases heat to exterior air, atmospheric air, outside of the building enclosure, that is outside of panels E, as this exterior atmospheric air passes, by natural flow, over the exterior surface.

Hand switches 57 and 58, respectively, are interposed in the two circuits from the thermostat 47, and for winter season operation one hand switch may be open and the other closed, and for the cooling season of summer, the opposite condition procures the cooling operation. But it may be noted that the thermostat 47 is of such operation that both of these hand switches may be closed, the thermostat 47, then effecting the necessary change, for either condition of operation. But the opening of one hand switch or the other prevents unnecessary operation, when the valve 43 is set for one or the other operation.

The walls X which are internally of conduit panels may serve to increase the efficiency of flow of heat for transfer and they also will serve to strengthen the panels and hold them rigid against the pressures within. The conduit panels may, however, be made in any manner which will form a strong panel which will not deform by the pressure internally and to this end the conduit panels may be made of any number of sections of conduit, and they may also have any form of surface exteriorly of the panels, on the exposed sides, which will tend to increase the efficiency of heat transfer, and increase the capacity of the conduit panels for heat transfer.

Referring now to the modified form of my device, which is shown in Figures 15, 16, 17, 18 and 19, this form is in general operation and construction similar to that of the first form described, with, however, some minor differences in the detailed devices and with, however, such operation that the main valve means V may be eliminated. This modified form has the exterior conduit panel E and the interior conduit panel I, as in the first form, each conduit panel having the internal conduit, M as to panel E and N as to panel I, and these conduits M and N, are connected at one end by means of the connecting element 1 in which are the passages 10, each of which has the automatic valve 11, one permitting flow one way and the other permitting flow the other way, the flow in either case being however, so restricted that pressure is maintained on the high pressure side as in the first form described.

The heat transfer unit is in this form generally designated as H1, and it is rather longer than the panel as first described, and may be stationed vertically in the building construction shown in Figure 18. This unit H1 has the connecting element 1 at the top end (right of Figure 15) and has at the bottom end (left in Figure 15) another connecting element 2a, and the latter has formed internally thereof, one connecting passage 59 which permits passage between the conduit N in conduit panel I and the passage 60 which is formed in the compressor casing 61, and another connecting passage 62 which is formed in connecting element 2a and permits passage between the conduit M in conduit panel E and the passage 63 which is formed in the compressor casing 61. The passage 60 is at one side of a vane type compressor rotor 64, having vanes 65, and the passage 63 is at the other side of the compressor rotor 64, so that in rotation of the compressor rotor 64 the compressor rotor will induct refrigerant fluid from one conduit panel E or L and discharge the refrigerant fluid under compression from the other side of the compressor rotor to the other conduit panel E or L. The induction and discharge of refrigerant fluid will be in a direction, as between the conduit panels, which will depend on the direcion of rotation of the compressor rotor 64, and that direction of rotation will depend on the direction of rotation of the shaft 29 which is connected with and is driven by the electric motor armature of the electric motor 33 which has the field coils 33a and commutator brushes 66.

The direction of rotation of the motor armature 33b will depend on the flow of electric current through the field coils 33a, which as shown in Figure 17 has two sets of field coils, one of which will procure rotation of the motor armature 33b in one direction and the other of which will procure rotation of the motor armature 33b in the opposite direction, and that flow will be determined by the thermostat two element 48a, as it may contact either contact 48 or 49, one of which procures the rotation for heating use and the other of which will procure the direction of rotation for cooling use of the device. Either one or the other of hand switches 57, 58, may be opened and the other closed, depending on the season, winter or summer, and if no operation is desired, both hand switches may be opened.

Since direction of rotation of the motor armature 33b and compressor rotor 64 will determine the direction of flow of refrigerant fluid in the conduit panels E and L, this direction of flow will, according to its determination by the thermostat 47, determine which panel, interior or exterior, is heated by the compressed fluid, and which receives the expanded fluid which will absorb heat. Thus either exterior or interior conduit panels may receive the compressed heated fluid and the other will receive the expanded and cooled fluid which will absorb heat. The interior panel in use as a heating medium will disperse heat by radiation and also by movement of the interior air inside of the panel that is along the exposed inner surface, and in this use the exterior panel by movement of exterior atmospheric air over its exposed surface, will absorb heat from that atmospheric air outside of the building enclosure. In use as a cooling means, the interior panel I will absorb heat from the interior air and the exterior panel will disperse heat to the exterior atmospheric air.

This modified form of heat transfer unit or panel generally denoted as H1, may be stationed either vertically or horizontally in a building wall to form part of that building wall, and use of this unit, stationed vertically is shown in Figure 18, where two of the units H1 are shown, one at each side of the window unit W, in the side wall of a building enclosure. Any number of such units may be used to form a part of the building enclosing walls of a construction, and this panel type of heat transfer may be incorporated in any part of the enclosure structure of a building, since in any panel unit, the conduit panels may be constructed of any material, as metal, aluminum or steel, or magnesium, or they may be of a plastic substance or of a glass, and in the latter case the panels may be transparent, as the center insulation between conduit panels of any unit may be merely air space (confined) or may have insulating material other than air therein. The insulating space IS may be such as to be a vacuum space, without air or other material, so that the vacuum provides the insulation.

I contemplate, particularly, that the expansion valve means may be of any type, such as may commonly be known, which will provide the neccessary restriction of flow in the pressure conduits and permit the expanded flow in the other conduit panel, and the compressor means may be of any type which will provide the necessary compression of the refrigerant and may accordingly be any type, such as centrifugal, axial flow, Rootes type compressor, gear type compressor, or otherwise, there being many types of compressor means which may be utilized with the construction. The single compressor and motor unit, as used in the first form, may be used with the compressor type, reversing flow, as in the second form, the compressor means serving a plural number of panels or units, as in the first form described.

While I have described and illustrated, particular devices and combinations of devices, in the disclosure of my invention, I contemplate that other detailed devices and combinations of devices may be used in the realization of my invention, without departing from the spirit and intention thereof.

What I claim is:

1. In a means of the character described, a unit adapted for incorporation as a section of a building enclosure and comprising; a pair of parallel fixed fluid conveying elements, each of said elements comprised of a pair of parallel panels spaced apart to provide conduit space intermediately of the pair of panels, the said elements being spaced apart to provide heat insulation between said pair of elements, and combining means attaching the said pair of elements each to the other and oppositely of each other; a connecting and flow restricting passage between the said elements at locations thereof adjacent to each other to provide for flow at said locations of the unit from conduit space of one said element to the adjacent location of the conduit space of the other said element; a compressing means interposed conductively with said elements at locations remote from the first named locations to circulate refrigerant fluid in a circuit including the said conduit spaces of said conveying elements; and a motor for driving said compressing means.

2. All of the means as described and as claimed in claim 1 and in combination; the said connecting flow restricting passage including fluid passage controlling means to procure maintenance of pressure in one of said elements.

3. All of the means as described and as claimed in claim 1 and in combination; means to reverse the flow of refrigerant fluid through the said parallel fluid conveying elements.

4. All of the means as described and as claimed in claim 1 and in combination; valve means interposed between the compressing means and the said interconnected locations of said elements to procure reversal of flow in said parallel fluid conveying elements.

5. All of the said means as described and as claimed in claim 1 and in combination; the said compressing means being a reversible compressing means and said motor being a reversible motor for alternatively driving the said compressing means in either direction to procure flow in one direction of flow through said pair of elements for heating of the interior space within the enclosure of which the unit is a part and alternatively to procure flow in an opposite direction through the said pair of elements for cooling of the interior space within the said enclosure.

6. In a means of the character described, a unit adapted for incorporation as a section of a building enclosure and comprising; a pair of parallel fixed fluid conveying elements each of said elements comprised of a pair of parallel panels spaced apart to provide conduit space intermediately of the pair of panels, the said elements being spaced apart to provide heat insulation between said pair of elements, and combining means attaching the said pair of elements each to the other and oppositely of each other; a connecting and flow restricting passage between the said elements at locations thereof adjacent to each other to provide for flow at said locations of the unit from the conduit space of one said element to the adjacent location of the conduit space of the other said element; locations of each of said elements remote from the first named locations having incorporated therewith means for fluid connection at such remote locations of the elements with, selectively, the pressure and suction sides of a compressor means for fluid circulation between the said fluid conveying elements.

7. All of the means as described and as claimed in claim 6, and in combination; a building construction having a plural number of sectional spaces of its enclosure each having fixed in such space the unit described, the said units each having an exposed surface of one of its elements exposed to space interiorly of the building construction and each having an exposed surface of the other of the elements exposed to space exteriorly of the building construction; a compressor unit associated with said units and motor means driving the compressor unit; a high pressure conduit from the compressor unit conductive to branch connections one to similarly exposed elements of said units and a low pressure conduit conductive to the compressor unit having branch connections one to similarly exposed elements of said units.

8. All of the means as described and as claimed in claim 6 and in combination; a compressor unit and motor means driving the compressor unit; a primary conduit having connection with one said element at the location remote from the location of the flow restricting passage, and a secondary conduit having connection with the other of said elements at the location remote from the location of the flow restricting passage; the primary and the secondary conduits having means for alternative connection with the exhaust and intake of the compressor unit, so that in one condition of operation the flow of fluid as circulated by the compressor unit is in one direction through the said fluid conveying elements and said flow restricting passage and so that in the alternative condition of operation the flow of fluid as circulated by the compressor unit is in the opposite direction of flow through the said fluid conveying elements and said flow restricting passage.

9. All of the means as described and claimed in claim 6 and in combination; a compressor unit having conductive ports either of which may be for fluid discharge under pressure and the other of which may be for fluid reception under low pressure, and motor means driving the compressor unit; the said means for fluid connection at one of said remote locations having conductive connection with one of said conductive ports and at the other of said remote locations having conductive connection with the other of said conductive ports; and means to reverse the operation of said compressor unit to procure reversals of the direction of flow of fluid through the said elements and said flow restricting passage.

10. All of the means as described and as claimed in claim 6 and in combination; a compressor unit having conductive ports one of which is for discharge of fluid under high pressure and the other of which is for reception of fluid under low pressure, and motor means for driving the compressor unit; valve passage means interposed between the compressor unit and the fluid connections at the locations of the said panels opposite to the locations where is the flow restricting passage; valve means interposed in said valve passage means for alternatively connecting the conducting ports of the compressor unit with said fluid connections, to procure in one condition flow in one direction through said elements and said flow restricting passage, and to procure in another condition flow in the opposite direction through said elements and said flow restricting passage.

References Cited in the file of this patent

UNITED STATES PATENTS

| | | |
|---|---|---|
| 2,110,022 | Kliesrath | Mar. 1, 1938 |
| 2,342,174 | Wolfert | Feb. 22, 1944 |
| 2,462,557 | Santee | Feb. 22, 1949 |
| 2,478,617 | Anderegg | Aug. 9, 1949 |

FOREIGN PATENTS

| | | |
|---|---|---|
| 354,658 | Italy | Dec. 1, 1937 |